Inventor
RICHARD H. LONG.
By H V Clayton
Attorney

March 8, 1955 R. H. LONG 2,703,636
POWER SYSTEM
Filed May 10, 1946 6 Sheets-Sheet 6

INVENTOR.
RICHARD H. LONG
BY
ATTORNEY.

United States Patent Office 2,703,636
Patented Mar. 8, 1955

2,703,636

POWER SYSTEM

Richard H. Long, South Bend, Ind., assignor to Bendix Aviation Corporation, South Bend, Ind., a corporation of Delaware Application May 10, 1946, Serial No. 668,971

9 Claims. (Cl. 192—.092)

This invention relates in general to means for controlling the operation of the speed controlling means of the prime mover of a power plant and in particular to means for controlling said speed controlling means incidental to (1) an operation of a clutch interconnecting said prime mover and the drive shaft of the power plant and (2) an operation of a change speed transmission incorporated in said power plant between the clutch and said drive shaft.

Yet another object of my invention is to provide, in the power plant of an automotive vehicle, means for preventing an opening of the engine throttle of the vehicle as power means of said power plant is operative to disengage the clutch and operate the transmission said means also serving to effect a certain synchronization of opening of the throttle with respect to the engagement of the clutch as said power means is operative to make possible the engagement of the clutch; and it is a further object of my invention to so construct said mechanism that the accelerator of the vehicle may be depressed during the operation of the power means.

Yet another object of my invention is to provide a power plant which may be incorporated in a vehicle, either marine craft or land vehicle, said power plant including a prime mover such as an internal combustion engine, means, such as an accelerator, for actuating the speed controlling means, a change speed transmission, a friction clutch interconnecting the transmission and prime mover and power means, controlled by an operation of the aforementioned manually operated means and by governor means, said power means serving to operate the transmission and to operate the clutch and control the operation of the speed controlling means to facilitate said operation of the transmission.

An object of my invention is to provide, in the power plant of an automotive vehicle, power means for operating the clutch and transmission of said power plant and for controlling the operation of the engine throttle of said plant, said power means including means interconnecting the throttle and accelerator of the power plant and means for controlling the operation of said connecting means, the parts of the mechanism being so constructed and arranged and so operative that the throttle may not be opened as the power means is operative to operate the clutch and transmission, the mechanism being also so constructed and arranged and so operative that with a depression of the accelerator, either before or after the completion of the aforementioned operations of the clutch and transmission, the throttle is opened in timed relation to the clutch engaging operation of the power means.

Yet another object of my invention is to provide, in the power plant of an automotive vehicle, means for operating the throttle, the clutch, and the transmission of said power plant, said means including a spring and pressure differential operated motor for operating the clutch and transmission and further including means, including relatively movable members, interconnecting the engine throttle and the accelerator of the vehicle together with means controlled by the aforementioned motor and operative to (1) prevent an opening of the throttle as the motor is operative to disengage the clutch and operate the transmission, and (2) operative to effect a certain coordination of operation of the throttle and clutch as the former is being opened and the latter is being engaged.

A further object of my invention is to provide means for operating the throttle, the clutch, and the transmission of an automotive vehicle, said means including force transmitting means interconnecting the accelerator and engine throttle of the vehicle, and stop means cooperating with said force transmitting means to (1) prevent an opening of the throttle as a motor is operative to effect a disengagement of the clutch and an operation of the transmission, and (2) cooperating with said force transmitting means to effect a certain coordination of operation of the throttle and clutch as the throttle is being opened and the clutch is being engaged.

Yet another object of my invention is to provide means, including relatively movable members, interconnecting the throttle and accelerator of an automotive vehicle, together with stop means, controlled by transmission and clutch operating power means, for controlling the position of one of the aforementioned relatively movable members to thereby control the operation of the throttle during the operation of the power means.

Other objects of the invention and desirable details of construction and combination of parts will become apparent from the following description of preferred embodiments, which description is taken in conjunction with the accompanying drawings, in which:

Figures 1, 2:
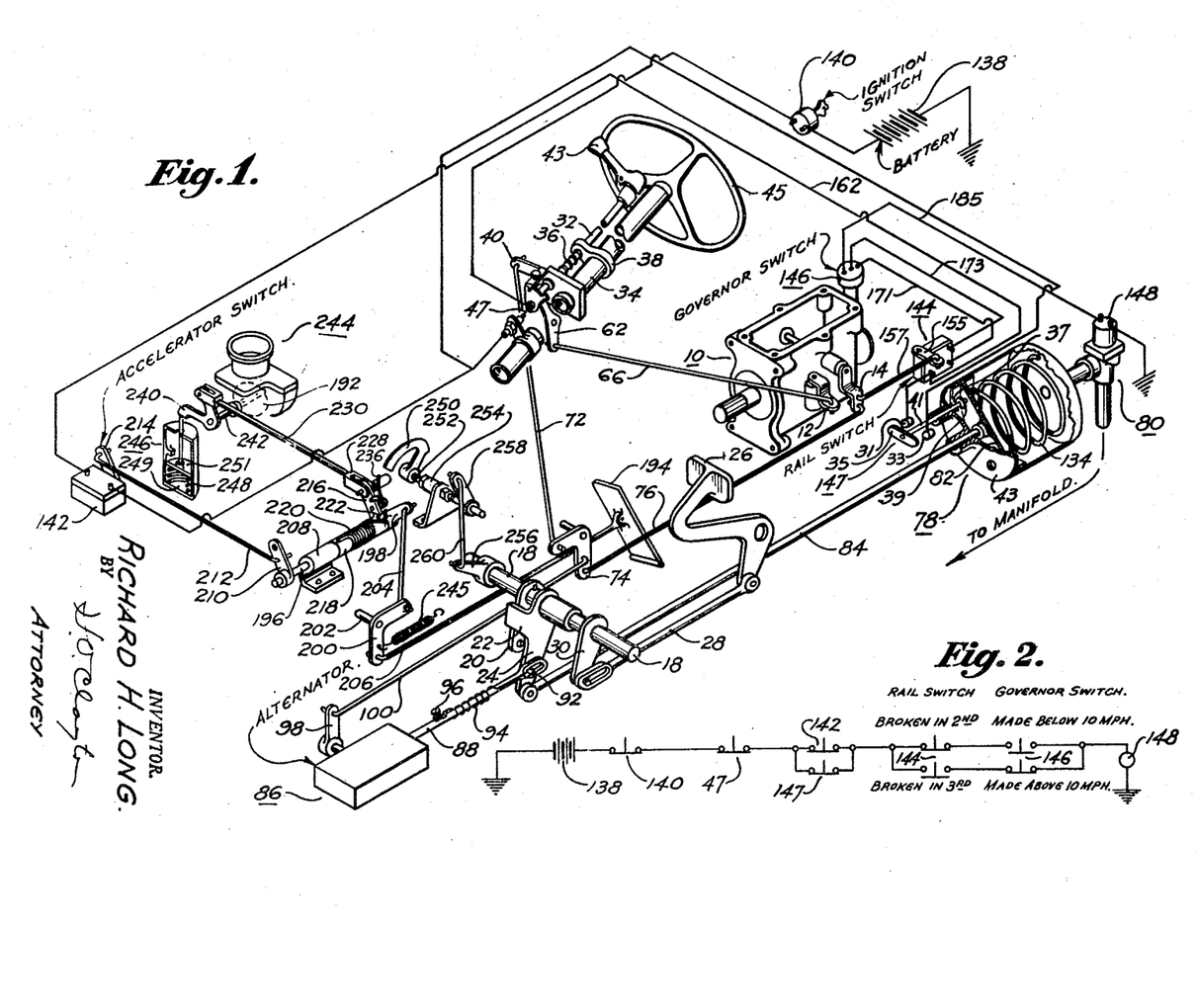
Figure 1 is a diagrammatic view of my invention disclosing the principal features thereof.
Figure 2 is a wiring diagram of the electrical mechanism disclosed in Figure 1.

Referring now to Figure 1 disclosing a preferred embodiment of my invention, a three-speeds forward and reverse transmission 10, preferably that used in one of the well known automative vehicles of the day, is operated by means of a manually operated crank 12 and a manually and power operated crank 14, the crank 12 serving to operate the shift rail selecting mechanism of the transmission and the crank 14 serving to operate that part of the transmission functioning to move the selector rail to establish the transmission in the desired gear ratio. With such a transmission the crank 14 must be moved to its transmission neutral position to neutralize the transmission before the shift rail selecting crank 12 may be operated.

My invention, that is a preferred embodiment thereof, resides in the throttle controlling mechanism disclosed in Figure 1 and Figures 13 to 17 inclusive and cooperates with the hereinafter described manually and power operated means for actuating the aforementioned transmission operating cranks 12 and 14 and for operating the conventional friction clutch of the power plant said clutch including the usual driving and driven plates forced into engagement by clutch springs. The aforementioned transmission and clutch as well as the hereinafter referred to fluid coupling are of conventional design accordingly no claim is made thereto and the same are not disclosed in the drawings. However as set forth above my invention in its broadest aspect resides in means for controlling the manually operated speed controlling means of the prime mover of a power plant the operation of said speed controlling means being coordinated with an operation of a change speed transmission of the power plant and an operation of clutch means interconnecting said transmission and prime mover. My invention is therefore not limited in its use to a part of the power plant of an automotive vehicle.

A feature of the mechanism disclosed in the drawings lies in the combination of a fluid coupling, such e. g. as that which was incorporated in several 1941 and 1942 passenger vehicles, with the aforementioned mechanism which operates the transmission and friction clutch; and said coupling, which is preferably incorporated in the power plant between the engine and the friction clutch, includes, of course, an impeller and a vaned rotor, the latter serving to drive the aforementioned driving plate of the clutch.

The friction clutch is operably connected to a clutch throw out shaft 18 to which is keyed a crank member 20 contactable by a flange member 22 extending laterally from a crank member 24 rotatably mounted on the shaft 18. The conventional manually operated clutch pedal 26 of the car is operably connected, by a link 28, to a crank 30 which is drivably connected to the shaft 18. As is disclosed in Figure 1 the connection between the crank 30 and link 28 is of the lost motion type to obviate a movement of the clutch pedal when the clutch is power operated by the mechanism described hereinafter.

Figure 5:
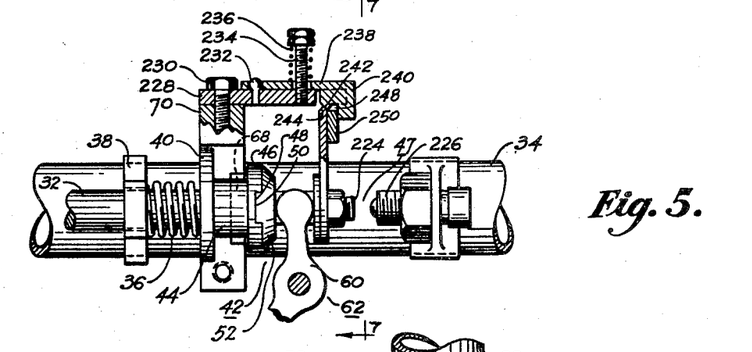
Figure 5 is an enlarged view of the mechanism at the base of the steering column said mechanism serving to disconnect the shift lever from the power operated transmission operating linkage.
Figure 6:
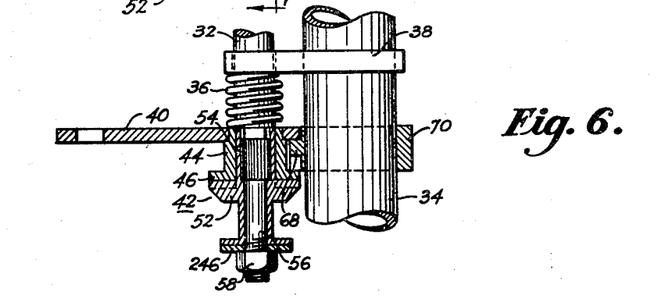
Figure 6 is a sectional view, taken on the line 6—6 of Figure 7, disclosing certain features of the mechanism disclosed in Figure 5.
Figure 7:
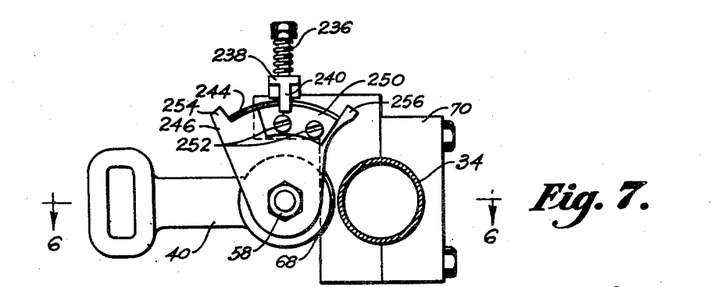
Figure 7 is a front view, taken on the line 7—7 of Figure 5, of the mechanism disclosed in Figure 5.

The shift rail operating cranks 12 and 14 are actuated by force transmitting means including a rotatable and bodily movable shaft 32 extending alongside the steering column 34 of the vehicle. As is disclosed in Figures 1, 5, and 6, the shaft 32 is biased downwardly by a spring 36 positioned between a stop 38 mounted on the steering column and a crank member 40 which is operably connected to said shaft by means of a clutch mechanism 42 described hereinafter. A shift lever 43 mounted beneath the steering wheel 45 is so connected to the shaft 32 that a rotation of said lever in a plane parallel to said wheel effects a rotation of said shaft about its longitudinal axis in the operation of either neutralizing the transmission or establishing the same in a gear setting; and this connection between the shift lever and shaft 32, which incidentally was used on the 1942 Dodge car, is also such that the cross-shift movement of the shift lever, that is the movement in a plane perpendicular to the plane of the steering column, results in a movement of the shaft 32 to either effect a shift rail selecting operation of the crank 12 or effect a declutching operation of the clutch 42 and a closing of a selector switch 47 to prepare the mechanism for its power operation.

Describing the aforementioned clutch mechanism 42, the said mechanism includes a member 44 sleeved over the lower end of the shaft 32, said member being permanently secured as by brazing to the crank 40. The lower end portion of the member 44 is provided with a flange 46 which is recessed at 48, Figure 5, to provide a keyway for a key portion 50 of a spool-shaped end portion of a clutch member 52, said member being sleeved over and drivably connected by splines 54 to the end portion 56 of the shaft 32. A nut 58, threaded on the end of the shaft portion 56, serves as a stop for the clutch mechanism which is biased downwardly by the operation of the spring 36.

The upper arm 60 of a bell-crank lever 62 fits within the spool shaped portion of the clutch member 52 and the lower arm 64 of said lever is pivotally connected, by a link 66, to the shift rail selecting crank 12. As is disclosed in Figure 6, the spring 36 serves to bias the clutch 42 and shaft 32 as a unit downwardly, the movement being limited by a stop 68, Figure 6, constituting a part of a steering column mounted bracket member 70; and in this position of the clutch 42 the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is a selection of the low and reverse gear shift rail of the transmission, the driver lifts the shift lever 43 upwardly in a plane perpendicular to the plane of the steering wheel; and this operation serves to rotate the bell crank lever 62 in a counter-clockwise direction, Figure 5, the spring 36 being compressed and the flange 46, Figure 6, being moved into engagement with the stop 68. To actuate the shift rail operating crank 14 to neutralize the transmission or establish the same in any one of its four gear ratio settings, the driver rotates the shift lever 43 in a plane parallel to the plane of the steering wheel thereby effecting an angular movement of the crank 40 which is preferably connected to the crank 14 by force transmitting means including link 72, a bell crank lever 74 and a link 76.

There is thus provided, by the above described mechanism, means for manually operating a three-speeds forward and reverse transmission; and in this manual operation of the transmission the shift lever 43 is movable to five different positions, said selective movement outlining the letter H.

Describing now the power means for controlling the operation of the throttle and operating the transmission and clutch the principal element of this power means consists of a single-acting fluid pressure motor 78 operably connected to the clutch throwout shaft 18 and to the shift rail operating crank 14; and said motor is controlled by a standard type of solenoid operated three way valve 80, no claim to which is made.

Describing now the details of the aforementioned power means, the power element 82 of the motor 78 is connected to the crank 24 by a link 84; and said crank is yieldingly connected to an alternator unit 86 by means, preferably including a pin 92 extending from the crank. One end of a spring 94, preferably coiled around the link 88, is connected to a pin 96 secured to said link; and the other end of said spring is fastened to the pin 92. A crank 98 of the alternator mechanism 86 is pivotally connected to the bell crank lever 74 by a link 100.

Figure 4:
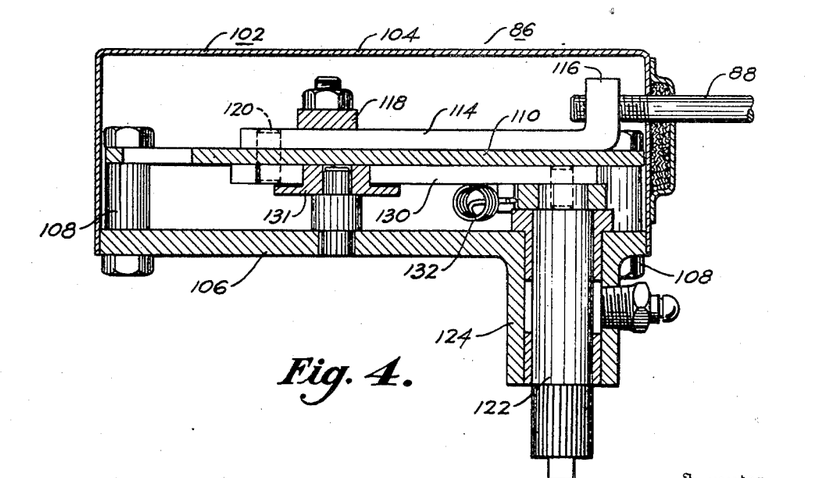
Figure 4 is a sectional view of the alternator unit said view being taken on the line 4—4 of Figure 3.

Describing now the details of the alternator 86, that is the direction changing mechanism of my invention, the same includes a casing 102, Figure 4, of two parts 104 and 106. To the casing part 106 there is detachably secured by bolts 108 a plate 110 having a V-shaped guide slot 112 therein, and a thrust member 114 adjustably secured at 116 to the link 88 and positioned between a strap 118 and the outer face of the plate 110 is provided with a laterally extending pin 120 which extends through the aforementioned V-shaped slot. To the outer end of a rotatable shaft 122 journalled in a boss 124 extending from the casing part 106 there is drivably connected the aforementioned crank 98, Figure 1; and to the inner end of the shaft 122 there is drivably connected a bell crank lever 126. To one end of the latter lever there is pivotally connected a thrust link 128 which is recessed at its outer end to receive the pin 120; and to the other end of the lever 126 there is pivotally connected another thrust link 130 which is also recessed at its outer end to receive the pin 120; and the two thrust links are biased towards each other into contact with a guide roller 131 by a spring 132 connected to both of said links.

Figure 3:
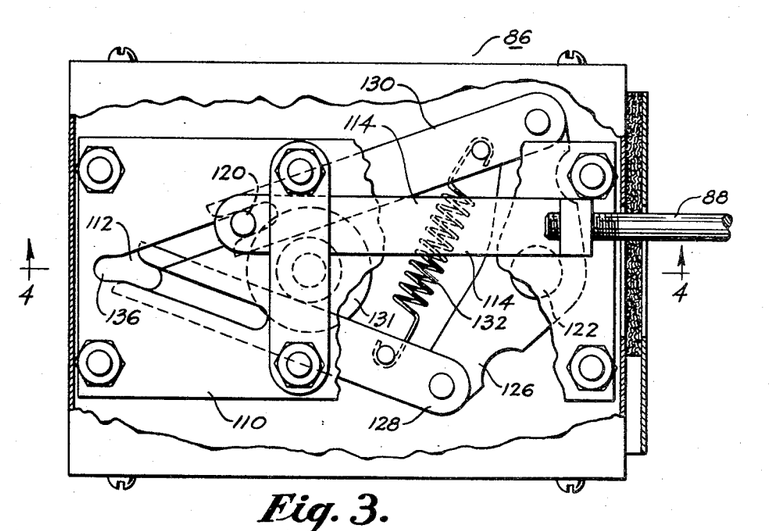
Figure 3 is a view disclosing details of the alternator unit of Figure 1.

Describing the operation of the above described alternator 86, when the fluid pressure motor 78 is deenergized a return spring 134 therein together with the clutch springs, serve to move the link 88 and thrust member 114 connected thereto to the left, Figure 3, to position the pin 120 within a recess 136 constituting the apex of the aforementioned V-shaped guide slot 112; then when the motor 78 is energized to effect an operation of the transmission and clutch the pin 120, after moving a relatively short distance, rests within the recessed end of one or the other of the thrust links 128 and 130, depending upon whether the transmission is at the time established in second gear or in high gear. Continued movement of the thrust member 114 then results in a rotation of the lever 126 to rotate the crank 98 to establish the transmission in its new setting; and as will be noted from an inspection of Figure 3 this operation of the lever 98 serves to move the then inoperative thrust link into position preparatory for its operation to rotate the lever 126.

There is thus provided an alternator or direction changing means whereby the transmission operating angular movement of the crank 14 is alternately reversed with each successive energization of the single-acting motor 78.

As to the means for controlling the operation of the motor 78, said means includes the electrical mechanism disclosed in Figures 1 and 2; and this mechanism comprises a grounded battery 138, the ignition switch 140 of the car, the aforementioned shift lever operated selector switch 47, an accelerator operated breaker switch 142 which is closed when the accelerator is released, a shift rail operated switch mechanism 144, a vehicle speed responsive governor operated switch mechanism 146, a breaker switch 147 operated by the motor piston 82 and a grounded solenoid 148 which operates the motor controlling three way valve 80. The aforementioned switch mechanisms are electrically interconnected as disclosed in Figure 2, and of said mechanisms the accelerator operated switch 142 and the motor operated switch 147 are of a conventional breaker switch construction accordingly, the same are not disclosed in detail. The breaker switch 147 which is shown diagrammatically in Figure 1 preferably comprises fixed contacts 31 and 33 and a movable contact 35, said switch mechanism being mounted by any suitable support, not shown, adjacent the end of the motor 78; and as is disclosed in Figures 1 and 2, said switch is wired in parallel with the accelerator-operated switch 142. A switch operating rod 41 is secured to the movable contact 35.

Describing the operation of the switch 147, when the motor 78 is energized, resulting in a movement of the piston 82 to the right, Figure 1, a spring 37 interposed between the flanged end 39 of the rod 41 and the end wall 43 of the motor serves to move said rod to the right thereby closing said switch; and when the return spring 134 within the motor is operative to return the piston 82 to the position disclosed in Figure 1, that is the clutch engaged position of the piston, the rod 41 is moved to the left by said piston to open the switch 147. There is thus provided an electrical circuit by-passing the parallel circuit controlled by the accelerator switch 142 and operative to maintain the electrical connection between the switches 144 and 148 as the motor piston 82 is moving to the right and despite an opening of the switch 142. The purpose of the inclusion of the switch 147 will be set forth in greater detail hereinafter.

Figure 8:
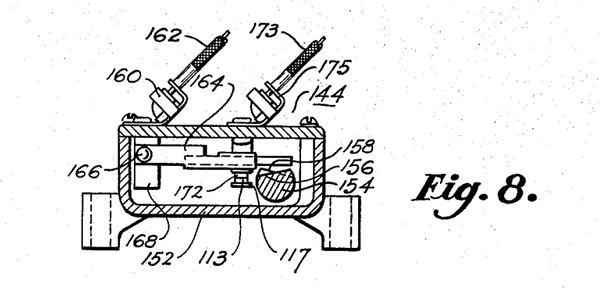
Figure 8 is a sectional view disclosing details of the transmission operating cut out switch of the invention, said view being taken on the line 8—8 of Figure 9.
Figure 9:
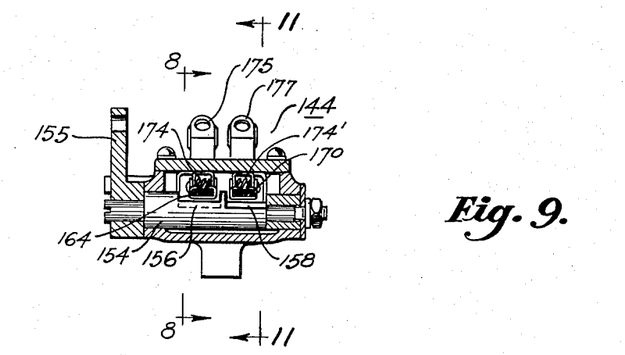
Figure 9 is a sectional view of the transmission operated cut out switch of my invention.

As to the rail switch mechanism 144, which is disclosed in Figures 8 and 9 in its transmission neutral position, the same includes a two part casing 152 having journalled therein a switch operating cam shaft 154; and said shaft is provided with an inclined flat 156 and an oppositely inclined flat 158. A crank 155 is secured to the end of the shaft 154 and said crank is connected to the shift rail operating crank 14 by a link 157. A switch terminal 160 receives a hot wire 162, Figure 1, and to this terminal there is electrically connected a movable switch member 164 of electrical conductive material and which is pivotally connected at 166 to a post 168 secured to the inner face of the casing.

Figure 11:
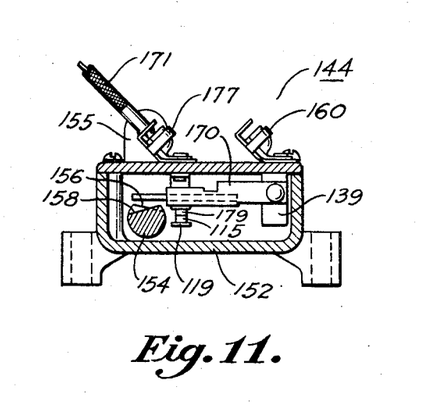
Figure 11 is a sectional view of the switch 144 similar to Figure 8, said view being taken on the line 11—11 of Figure 9.
Figure 12:
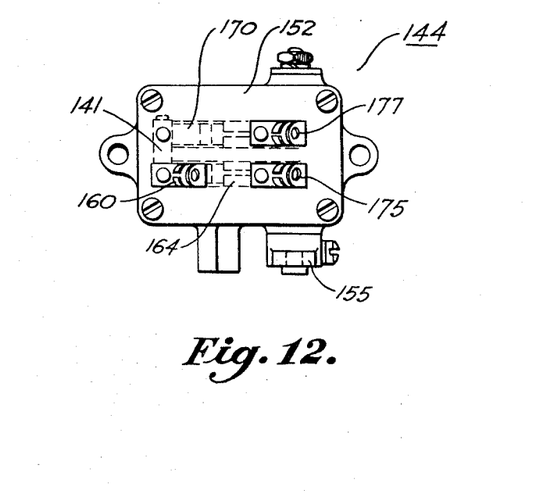
Figure 12 is a plan view disclosing details of the switch 144.

Another movable switch member 170, positioned alongside the switch member 164, is electrically connected, by a conductor 141, to the terminal 160. This switch member 170 is pivotally connected to a post 139 extending inwardly from the casing; and to said movable switch members there are secured switch contacts 172 and 179 disclosed respectively in Figures 8 and 11. Torsion springs 174 and 174' serve to bias the switch members 164 and 170 downwardly to move the aforementioned movable switch contacts 172 and 179 into engagement respectively with fixed switch contacts 113 and 115 which are mounted on supports 117 and 119 secured to the switch casing; and said contacts 113 and 115 are electrically connected, by said support members, to terminals 175 and 177, Figure 9, which are wired to the governor operated switch 146 by wires 173 and 171 respectively.

Describing the operation of the switch mechanism 144, when the transmission operating crank 14 is rotated clockwise by the power means to establish the transmission in its second gear setting the switch operating crank 155 is also moved in a clockwise direction and this operation serves to rotate the cam shaft 154 clockwise, Figure 8, to open the switch 115, 179 said opening being effected as the operation of the transmission is being completed. The switch mechanism 144 of my invention is also so constructed, that is the cam faces 156 and 158 are so inclined and so spaced with respect to the closed switches 113, 172 and 115, 179 that a counterclockwise rotation of the crank 155 to establish the transmission in its high gear setting will effect an opening of the switch 113, 172 when said setting is completed. The aforementioned switches 113, 172 and 115, 179 are closed at all times except when the crank 155 is in one or the other of its extreme positions this being necessary to make possible the operation of the mechanism of my invention; for it is made clear from an examination of Figures 1 and 2 that once closed the electrical circuit for controlling the grounded solenoid 148 must be maintained closed until the vacuum operation of the motor 78 is completed.

Figure 10:
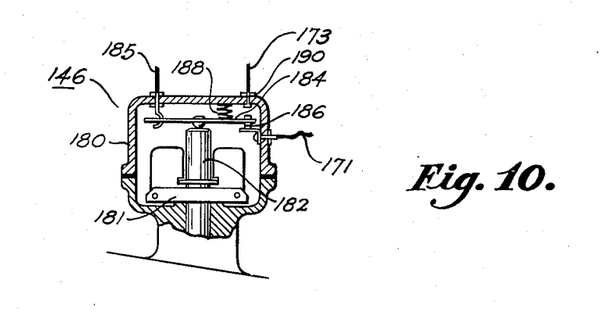
Figure 10 is a sectional view disclosing details of the governor operated switch of the invention.

Describing the governor operated switch mechanism 146, this mechanism includes a two part casing 180 housing a centrifugally operated governor mechanism 181 which is drivably connected to the propeller shaft of the vehicle or some other moving part of the power plant, the speed of which is directly proportional to the speed of the vehicle. A thrust member 182 of the centrifugal mechanism contacts the central portion of a movable switch contact member 184 which is biased into engagement with a fixed contact 186 by a spring 188. The parts of this switch mechanism are so constructed and arranged and so operative that when the vehicle is at a standstill or is travelling at or below a relatively low speed, for example 10 M. P. H., then the spring 188 serves to move the movable contact member 184 into engagement with the fixed contact 186; and when the vehicle is travelling above governor speed, that is the aforementioned 10 M. P. H., then the centrifugally operated mechanism 181 is operative to force the contact 184 into engagement with a fixed contact member 190. Completing the description of the switch mechanism 146 the other end of the movable contact member 184 is electrically connected to a wire 185 which is connected to the solenoid 148.

Now as will be noted from an inspection of Figure 2 of the drawings the parts of the shift rail operated switch 144 are so operative and so cooperate with the governor operated switch 146 that an electrical circuit from the accelerator operated switch 142 to the solenoid 148 is completed when (1) the transmission is established in either second gear or high gear and (2) the governor is operated to close one or the other of the two switches operated thereby; for just as the second gear setting of the transmission is being completed one of the switches of the switch mechanism 144 is broken and the other switch of said switch mechanism is at the time made to thereby prepare for a high gear operation of the mechanism of my invention; then when the speed of the vehicle goes above governor speed to close the switch 184, 190, the motor 78 is again energized to effect the high gear setting of the transmission. It is to be remembered, however, that the above discussed electrical circuits are completed to effect an energization of the motor 78 only when the accelerator is released to close the switch 142; and it is to be noted at this juncture that the motor operated switch 147 is moved to its closed position immediately after the movement of the piston 82 is initiated to effect a disengagement of the clutch and an operation of the transmission that is the movement of said piston to the right, Figure 1. It is apparent therefore from an inspection of Figure 2 that the switch 147, wired as it is in parallel with the switch 142, provides an electrical means for insuring the completion of the clutch disengaging and transmission operating operation of the motor 78 despite an opening of the switch 142 during said operation. In other words the accelerator may be depressed, resulting in an opening of the switch 142, without cutting off the operation of the motor 7 to disengage the clutch and operate the transmission.

Describing now the essence of my invention, that the means for controlling the operation of the engi throttle 192, said control means is disclosed in Figu 1 and Figures 13 to 17 inclusive of the drawings. T accelerator 194 of the vehicle is operatively connect to a shaft 196 by means of a crank 198 secured to sa shaft, a bell crank lever 200 pivotally mounted on a p 202, a rod 204 interconnecting the lever 200 and crank 198, and a rod 206 interconnecting the accelerator and the lever 200. The shaft 196 is journalled in a bearing 208 and to one end of said shaft there is secured a crank 210 which is connected, by a rod 212, to a crank 214 serving to operate the aforementioned accelerated operated breaker switch 142. A crank member 216 is secured to one end of a sleeve member 218 which is rotatably mounted on the shaft 196; and the cranks 198 and 216 are yieldingly interconnected by means of a coil spring 220 sleeved over the sleeve member 218, one end of the spring 220 being secured to the body of the sleeve member 218 and the other end of said spring being biased into engagement with a boss 222 projecting laterally from one side of the crank 198. The spring 220 therefore when released serves to bias the cranks 198 and 216 to the relative positions disclosed in Figures 1 and 13.

Figure 13:
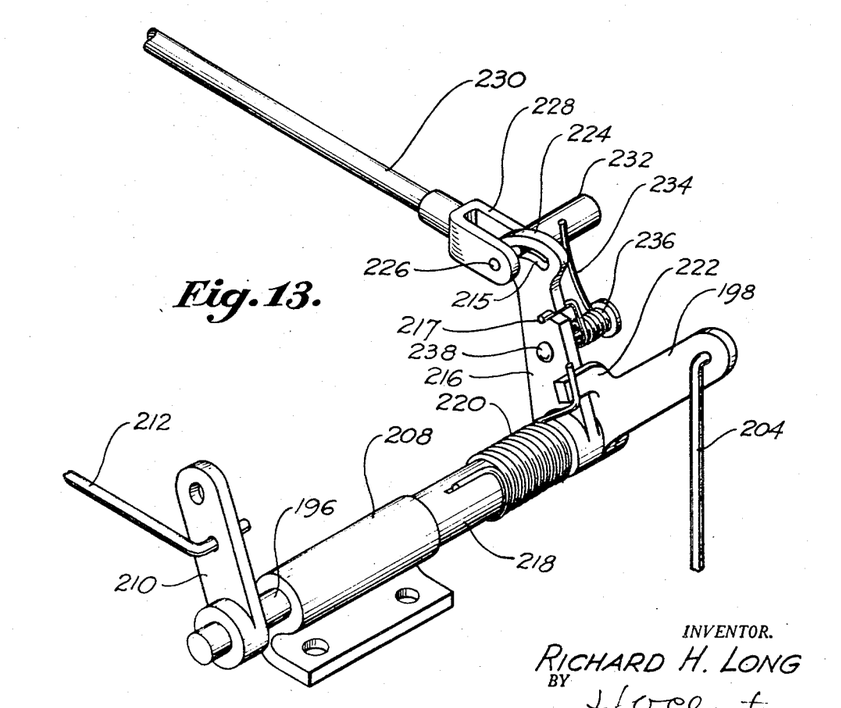
Figure 13 is a figure disclosing details of the lost-motion connection incorporated in the linkage interconnecting the accelerator and throttle of the mechanism of Figure 1.

The crank 216 is provided with a slot 215 in an end portion 224, Figure 13, and through said slot there extends a pin 226 mounted in the U-shaped, that is bifurcated end 228 of a rod 230. To one end of the pin 226 there is secured a pin 232 and one end 234 of a coil spring 236 serves to bias said pin to the left, Figure 13, toward the left end portion of the slot in the crank 216. The spring 236 is mounted on a pin 238 mounted in and extending laterally from the crank 216 one end 217 of said spring being fitted within an opening in said crank. The rod 230 is pivotally connected to a bell crank lever 240 the hub of said lever being fixedly secured to a shaft 242 serving to operate the aforementioned throttle valve 192 of the carburetor 244 of the vehicle. Upon release of the accelerator a return spring 245 secured to the lever 200 is operative to successively close the switch 142 and the throttle the latter operation being cushioned by the operation of a dashpot 246. Describing these operations the spring 245, as it contracts, serves first to close the switch 142 the cranks 198, 210 and 216 rotating counterclockwise, Figure 13. The spring 245, which is stronger than the spring 236, then serves, by virtue of the operation of the dashpot, to close the throttle at a relatively slow rate; for as the spring 248 is compressed air from a compartment 249 of the dashpot escapes past a piston 251 thereof. Explaining this operation it is to be noted that (1) the spring 236 is stronger than the dashpot spring 248 and (2) the switch operating crank 214 may be moved counterclockwise after the switch 142 is closed. Lastly the spring 245 serves to continue the counterclockwise rotation of the cranks 198 and 216 after the throttle is completely closed and the spring 248 has gone solid; and this operation results in a further compression of the spring 236 the crank 216 being rotated counterclockwise until the pin 226 is positioned in the extreme right end of the slot 215 in the crank 216.

When the accelerator is depressed to open the throttle and open the switch 142 the first increment of its movement serves to effect the latter operation and in this operation the pin 226 returns to the position in the slot 215 disclosed in Figure 13. A continued depression of the accelerator then serves, of course, to open the throttle.

A motor operated cam-like stop member 250, disclosed in detail in Figures 14 to 17 inclusive, serves to determine the operative position of the aforementioned pin 232 the face of said stop being curved as disclosed in said figures. This stop 250, which is preferably a segment of a disk or washer, is non-rotatably secured to a shaft 252 journalled in a bearing 254 and said shaft is operably connected to the motor 78, by means including a crank 256 non-rotatably secured to the clutch operating motor driven shaft 18, a crank 258 non-rotatably secured to the shaft 252, and a rod 260 interconnecting said cranks.

Figure 16:
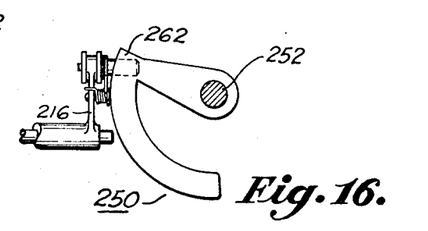
Figure 16 is a view similar to Figure 14, disclosing the stop mechanism in position to prevent an opening of the throttle.
Figure 17:
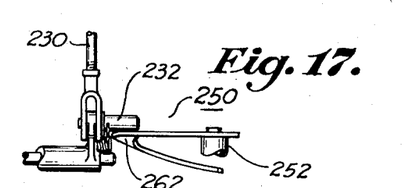
Figure 17 is a plan view of the mechanism disclosed in Figure 16.

Describing the operation of the stop 250 the first increment of movement of the motor piston 82, in the operation of disengaging the clutch and operating the transmission, serves to rotate said stop counterclockwise to the position disclosed in Figures 16 and 17; and in this position the pin 232 abuts a heel portion 262 of said stop thereby preventing an opening of the throttle 192. If the accelerator is depressed during this operation of the motor piston 82 then this operation of the accelerator serves to increase the tension of the coil spring 220 the crank 198 moving away from the crank 216 which, of course, remains stationary. The crank 216 is by this operation subjected to a load imparted by the spring 220.

Figure 14:
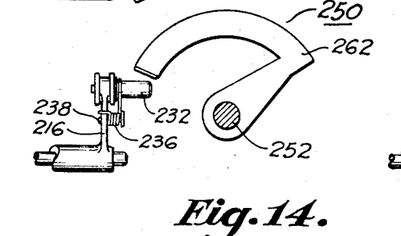
Figure 14 is a front view of the principal parts of the clutch operated stop mechanism of my invention, said mechanism serving to control the operation of the throttle.
Figure 15:
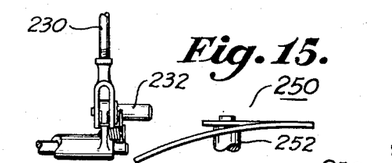
Figure 15 is a plan view of the mechanism of Figure 14.

Describing now the operation of the stop 250 as the clutch is being engaged that is when the piston 82 starts its leftward movement by the expanding operation of spring 134, there results a clockwise rotation of said stop, Figure 14, this operation being effected by the springs of the friction clutch as they expand to effect an engagement of the clutch. The engagement of the clutch may therefore be said to be controlled by the operation of the motor 78. Now as the stop 250 rotates to the right as the clutch is being engaged the pin 232 is pressed against the curved that is cam face of said stop; and the parts of the mechanism of my invention are so constructed and arranged and so operative that the opening of the throttle is effected immediately after the clutch plates first contact with each other the pin 232 being at this time positioned at about the mid-point of the face of the stop. Thereafter the curve of the face of the stop is such that the throttle is progressively opened as the clutch plating loading is progressively increased; and this is the operation desired for it simulates a driver's manually controlled engagement of a friction clutch as he depresses the accelerator to speed up the engine.

There is thus provided, by the above described embodiment of my invention, means for controlling the operation of the throttle of an automotive vehicle said means cooperating with clutch and transmission operating power means to (1) prevent an undesired opening of the throttle as the power means is operative to disengage the clutch and operate the transmission and (2) effect a smooth engagement of the clutch, immediately after the aforementioned operations of the clutch and transmission are completed, by synchronizing the engagement of the clutch with the opening of the throttle.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with an engine controlling throttle, a throttle operating accelerator and a change-speed transmission, means, including two relatively movable cranks, interconnecting the accelerator and throttle, power means for operating the transmission, and means operated by said power means and operable upon one of the cranks to maintain the throttle closed when the power means is operating to effect a setting of the transmission.

2. In an automotive vehicle provided with an engine controlling throttle, a throttle operating accelerator, a friction clutch and a change-gear transmission, means, including a plurality of relatively movable cranks, interconnecting the accelerator and throttle, power means for operating the clutch and transmission, and means actuated by the power means and operable upon one of said cranks to insure a closure of the throttle as the power means is operating to effect a dis-engagement of the clutch and a gear changing operation of the transmission.

3. In an automotive vehicle provided with an engine throttle, an accelerator, a friction clutch, and a change-speed transmission; means interconnecting the accelerator and throttle including a crank operably connected to the throttle, a crank operably connected to the accelerator and a spring serving to interconnect said cranks and bias the same toward each other, throttle controlling means connected with the clutch and cooperating with the first mentioned crank, and power means including a spring and vacuum operated motor for operating the clutch and transmission and for controlling the operation of the aforementioned throttle controlling means; the parts of the aforementioned mechanism being so constructed and arranged and so operative that when the motor is vacuum operated the clutch is disengaged, the transmission is operated to effect a new setting, and the throttle controlling means is operated to maintain the throttle closed during said operations of the clutch and transmission; the parts of the mechanism being also so operative that when the motor is spring energized and a throttle opening force is being exerted upon the accelerator, there results an operation of the throttle controlling means to effect a controlled opening of the throttle in synchronization with the engagement of the clutch.

4. In an automotive vehicle provided with an engine throttle, an accelerator, a friction clutch, and a change-speed transmission; means interconnecting the accelerator and throttle including a crank operably connected to the throttle, a pin member connected to said crank, a crank operably connected to the accelerator, a spring serving to interconnect said cranks and to bias the same toward each other, throttle controlling means, including a stop member contactable with the aforementioned pin member and connected with the clutch, and power means, including a spring and vacuum operated motor, for operating the clutch and transmission and for controlling the operation of the aforementioned throttle controlling means; the parts of the aforementioned mechanism being so constructed and arranged and so operative that when the motor is vacuum operated the clutch is disengaged, the transmission is operated to effect a new setting, and the throttle controlling means is operated to maintain the throttle closed during said operations of the clutch and transmission; the parts of the mechanism being also so operative that when the motor is spring energized and a throttle opening force is being exerted upon the accelerator there results an operation of the throttle controlling means to effect, in cooperation with the first-mentioned means, a controlled opening of the throttle in synchronization with the engagement of the clutch.

5. In an automotive vehicle provided with an engine throttle, an accelerator, a spring operated friction clutch, and a change-speed transmission; means interconnecting the accelerator and throttle including a crank operably connected to the throttle, a pin member connected to said crank, a crank operably connected to the accelerator, a spring serving to interconnect said cranks and to bias the same toward each other, throttle controlling means, including a stop member contactable with the aforementioned pin member, connected with the clutch, and power means including a pressure differential operated motor for operating the clutch and transmission and for controlling the operation of the aforementioned throttle controlling means; the parts of the aforementioned mechanism being so constructed and arranged and so operative that when the motor is energized the clutch is disengaged, the transmission is operated to effect a new setting, and the throttle controlling means is operated to maintain the throttle closed during said operations of the clutch and transmission; the parts of the mechanism being also so operative that when the motor is deenergized there results, by virtue of the operation of the clutch springs and by virtue of a force exerted by the driver of the vehicle upon the accelerator pedal, an operation of the throttle controlling means to effect, in cooperation with the first-mentioned means, a controlled opening of the throttle in synchronization with the engagement of the clutch.

6. In an automotive vehicle provided with an engine controlling throttle, an accelerator, a drive shaft and force transmitting means interconnecting the engine and driven shaft, throttle controlling means operative to facilitate the operation of said force transmitting means said throttle controlling means including force transmitting means interconnecting the accelerator and the throttle and further including a stop member having an effective cam shaped surface, said stop member being movable into and out of the path of a part of the last-mentioned force transmitting means and operative, in one of its operative positions, as a stop member to prevent a throttle opening movement of the latter force transmitting means and further operative, as it moves in a certain direction and when the driver of the vehicle is exerting a throttle opening force upon the accelerator as a cam member to control the degree of the opening movement of the latter force transmitting means and thereby control the mode of opening of the engine throttle.

7. In an automotive vehicle provided with an engine throttle, an accelerator, a friction clutch, and a change speed transmission; power means for operating the clutch and transmission including an accelerator operated switch; force transmitting means interconnecting the accelerator, the switch and the throttle and including yieldable means cooperating with certain parts of the force transmitting means to provide a lost motion connection which may be operated during the opening of the throttle, said force transmitting means further including another yieldable means cooperating with certain parts of the force transmitting means to provide another lost motion connection, and means for controlling the throttle and switch closing movement of the force transmitting means comprising a return spring stronger than the last-mentioned yieldable means and a dash pot including a spring member weaker than the latter yieldable means; the parts of said mechanism being so constructed and arranged and so operative that with an operation of the return spring the switch is first closed and said operation being immediately followed by an operation of the dash pot to effect a relatively slow closing of the throttle.

8. Throttle controlling means for facilitating the operation of power means for operating the friction clutch of an automotive vehicle, said throttle controlling means including force transmitting means interconnecting the accelerator and the throttle of the vehicle, and a stop member of segmental configuration having an effective cam-shaped surface, said surface being movable into and out of the path of a part of said force transmitting means, said stop member operating, as it moves in one direction and as a throttle opening force is being exerted upon the accelerator, as a cam member to control the degree of throttle opening movement of the aforementioned part of the force transmitting means and thereby control the mode of opening of the throttle.

9. Throttle controlling means for facilitating the operation of power means for operating the friction clutch of an automotive vehicle, said throttle controlling means including force transmitting means interconnecting the accelerator and the throttle of the vehicle, and a stop member having an angular segmental surface said surface being movable into and out of the path of a part of said force transmitting means, said segmental surface operating, as it moves in one direction and as a throttle opening force is being exerted upon the accelerator, has a cam member to control the degree of throttle opening movement of the aforementioned part of the force transmitting means and thereby control the mode of opening of the throttle.

References Cited in the file of this patent

UNITED STATES PATENTS

| | | |
|---|---|---|
| 1,436,422 | Wiles | Nov. 21, 1922 |
| 1,911,599 | Bloxsom | May 30, 1933 |
| 1,979,488 | Perez | Nov. 6, 1934 |
| 2,062,104 | Prince | Nov. 24, 1936 |
| 2,626,691 | Price | Jan. 27, 1953 |